United States Patent
Jan Geelhoed

(10) Patent No.: US 7,810,208 B2
(45) Date of Patent: Oct. 12, 2010

(54) COMBINED AXIALLY AND RADIALLY LOADED DIRT EXCLUDER

(75) Inventor: Johannis Adriaan Jan Geelhoed, Greene, IA (US)

(73) Assignee: Hampton Hydraulics, LLC, Hampton, IA (US)

( * ) Notice: Subject to any disclaimer, the term of this patent is extended or adjusted under 35 U.S.C. 154(b) by 937 days.

(21) Appl. No.: 11/654,258

(22) Filed: Jan. 17, 2007

(65) Prior Publication Data

US 2008/0168615 A1    Jul. 17, 2008

(51) Int. Cl.
*F16J 15/32* (2006.01)
(52) U.S. Cl. .................. 15/256.5; 15/104.04; 15/246; 277/562; 277/568; 384/15; 384/16
(58) Field of Classification Search .............. 15/104.04, 15/246, 256.5; 277/436, 562, 568; 384/15, 384/16
See application file for complete search history.

(56) References Cited

U.S. PATENT DOCUMENTS 3,339,932 A *   9/1967   Maha .................... 277/552
3,934,888 A *   1/1976   Lutz ..................... 277/559
5,257,432 A    11/1993   Duke \* cited by examiner

*Primary Examiner*—Mark Spisich
(74) *Attorney, Agent, or Firm*—Kent A. Herink; Emily E. Harris

(57) ABSTRACT

An improved rod wiper for excluding dirt and other environmental materials from a linear actuator is described. The annular wiper element includes an outwardly extended lip that is in constant engagement with the front face of the actuator housing. Not only does the lip assist in creating a seal with the housing, it redirects axial forces to have a radial component on the inwardly extended lips of the wiper element in contact with the rod to improve the seal of the wiper element and rod.

3 Claims, 2 Drawing Sheets

COMBINED AXIALLY AND RADIALLY LOADED DIRT EXCLUDER

BACKGROUND OF THE INVENTION

The invention relates generally to a rod wiper or dirt excluder of a linear actuator and, more specifically, to an improved elastomeric annular element surrounding the rod of a hydraulic or pneumatic actuator for excluding dirt from entering the actuator.

Linear actuators are in widespread use in many applications where a linearly directed force is required or useful. Most frequently, the linear actuators are either operated by a pressurized fluid, typically air or hydraulic fluid. Such pneumatic or hydraulic actuators have a rod or ram that is extended and retracted relative to a cylindrical housing. Since the rod extends through an opening in the housing and must move relative to the opening, the possibility exists for environmental materials, such as dirt, to enter the housing through the opening adjacent the rod and interfere with the operation of the actuator. It has become common to use an annular rod wiper element surrounding the rod to assist in excluding dirt and other environmental materials from entering the housing. The wiper element is typically retained in an annular groove in the housing and is biased into close contact with the rod by a variety of means. An example of an annular rod wiper element is described in U.S. Pat. No. 5,257,432. An elastomeric O-ring is used to bias the wiper element into contact with the rod.

While conventional rod wiper elements work effectively under many operating conditions, dirt and other environmental materials can pass the wiper under more severe conditions, for example when there is severe eccentricity of the rod, if the rod flexes under high load or if dirt accumulates on the rod.

SUMMARY OF THE INVENTION

The invention consists of an annular rod wiper element of improved shape and design and of an improved rod wiper assembly including the wiper element. The annular wiper element is received in an annular groove near the forward end of the actuator housing and disposed about the rod. The annular wiper element includes a pair of axially spaced, inwardly extended lips that are in constant engagement with the rod of a linear actuator. An annular concave section is preferably formed between the two inwardly extended lips. Also included is an outwardly extended lip at the forward side of the wiper element that is constant engagement with the forward face of an inwardly extended flange of the actuator housing. The outwardly extended lip thus assists in excluding dirt from entering the actuator at the forward end of the housing and the pair of inwardly extended lips assist in excluding dirt from entering the actuator along the rod. In addition, axial forces on the forward inwardly extended lip and the outwardly extended lip and transmitted between each other so that a force on one of the lips increases the sealing force on the other lip.

In assembly in an actuator, an elastomeric load ring is also included in the annular groove between an axially extended face of the groove and the wiper element rearwardly of the outwardly extended lip. The load ring assists in maintaining proper sealing contact of the wiper element with the actuator housing and rod.

DETAILED DESCRIPTION OF PREFERRED EMBODIMENTS

Figure 1:
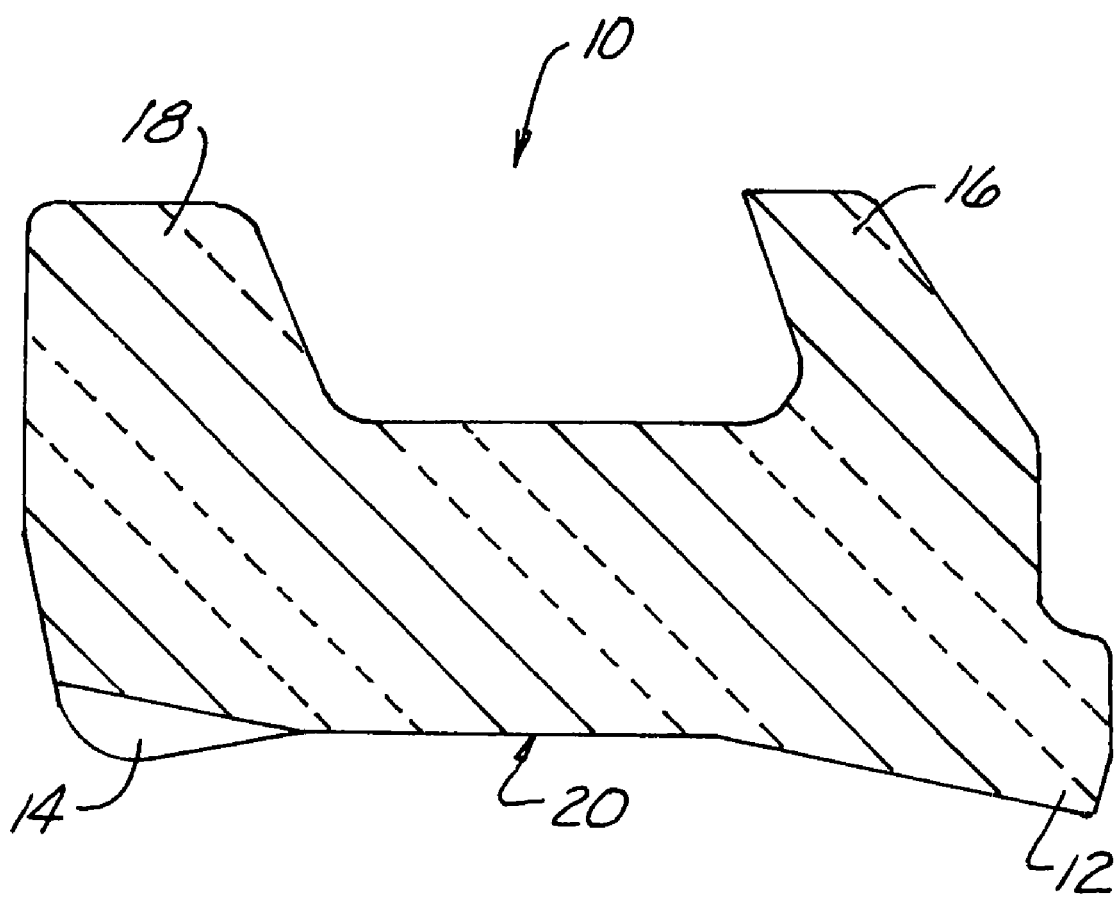
FIG. 1 is a cross-sectional drawing of an annular rod wiper element of a preferred embodiment of the present invention.

In a preferred embodiment of the present invention, an annular rod wiper element 10 is formed of an elastomeric material and has a relaxed cross section as seen in FIG. 1. The wiper element 10 includes a forward, inwardly extended annular lip 12 and an axially spaced rearward, inwardly extended annular lip 14. Disposed radially outwardly of the annular lips 12 and 14 are a lip 16 and axially spaced lobe 18, respectively. Since the lips 12 and 14 extend radially inwardly, a concave region 20 is formed between them.

Figure 2:
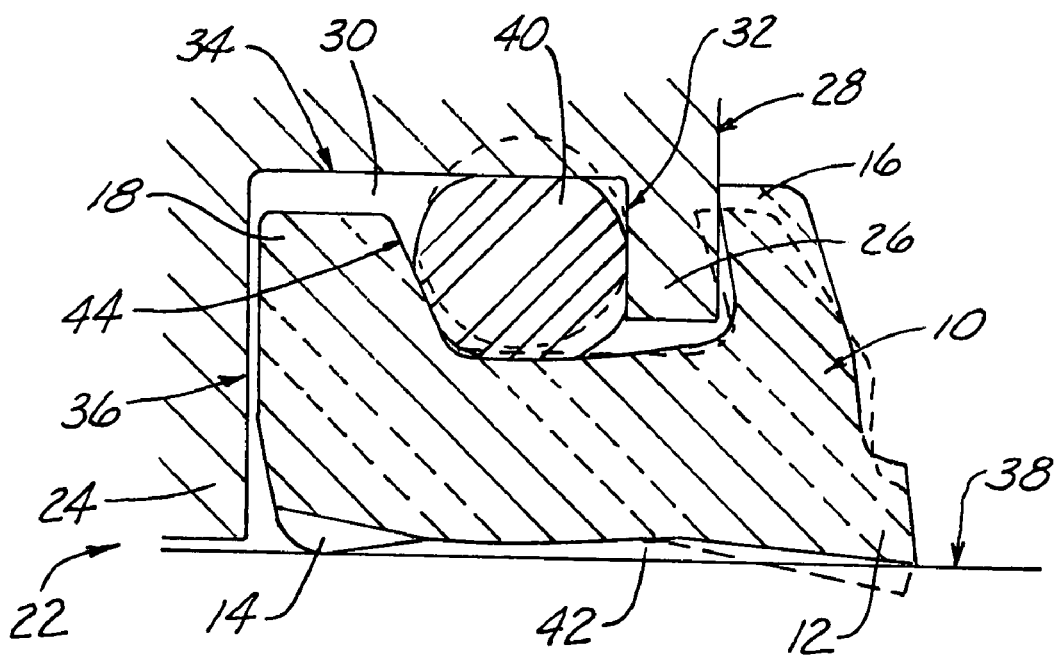
FIG. 2 is a partial cross-sectional view of a cylinder housing and rod provided with an annular wiper element of FIG. 1 showing the shape of the uninstalled rod wiper element in broken line.

A section of a linear actuator, which in the preferred embodiment is a hydraulic cylinder, is illustrated in FIG. 2, generally at 22. An actuator housing 24 of the actuator 22 has, in the preferred embodiment, an inward or radially extended flange 26 having a front face 28. An annular groove 30 is formed in the actuator housing 24 and is defined by a front face 32 on the rearward side of the flange 26, a circumferential face 34 and a rear face 36. A rod 38 extends from the interior to the exterior of the actuator housing 24.

The wiper element 10 is inserted into the annular groove 30 as illustrated in FIG. 2. An elastomeric load ring 40 is also present in the annular groove 30 between the circumferential face 34 and the forward and rearward lips 12 and 14 of the wiper element 10. The wiper element 10 and the load ring 40 flex in response to the confining geometry of the annular groove 30. The flexed shape of the wiper element 10 and the load ring 40 are shown in solid line in FIG. 2 and their relaxed shapes are shown in broken line. Both the forward lip 12 and the rearward lip 14 are in constant contact with the rod 38 with the radial gap 42 formed between the rod 38 and the concave region 20 permit flexing of the lips 12 and 14. The forward lip 16 is flexed forwardly and outwardly by contact with the front face 28 of the flange 26 which serves to increase the biasing force on the forward lip 12 toward the rod 38.

Load ring 40 is in contact engagement with the annular groove 30 at the circumferential face 34 and also the front face 32. It is also in contact engagement with the wiper element 10 in the gap between the lips 16 and 18 and with the angular rear inside face 44 or the rearward lip 18. The load ring 40, by being compressed between the annular groove 30 and the wiper element 10, thus increases the biasing load of the lips 12 and 14 against the rod 38 and, further, increase the bias of the lip 16 against the flange 26 which acts as a fulcrum point and further increasing the bias of the lip 12 against the rod 38. The load ring thereby maintains a combined load on the lips 12, 14, and 16, and lobe 18, to create and maintain sealing contact with the actuator housing 24 and the rod 38 to effectively exclude dirt and other foreign materials in the environment from entering the actuator 22. Moreover, the radial gap 42 between the wiper element 10 and the rod 38 allows deformation of the wiper element 10 caused by eccentric movements of the rod 38 during its reciprocating movement in a cycle of the actuator 22.

Figure 3:
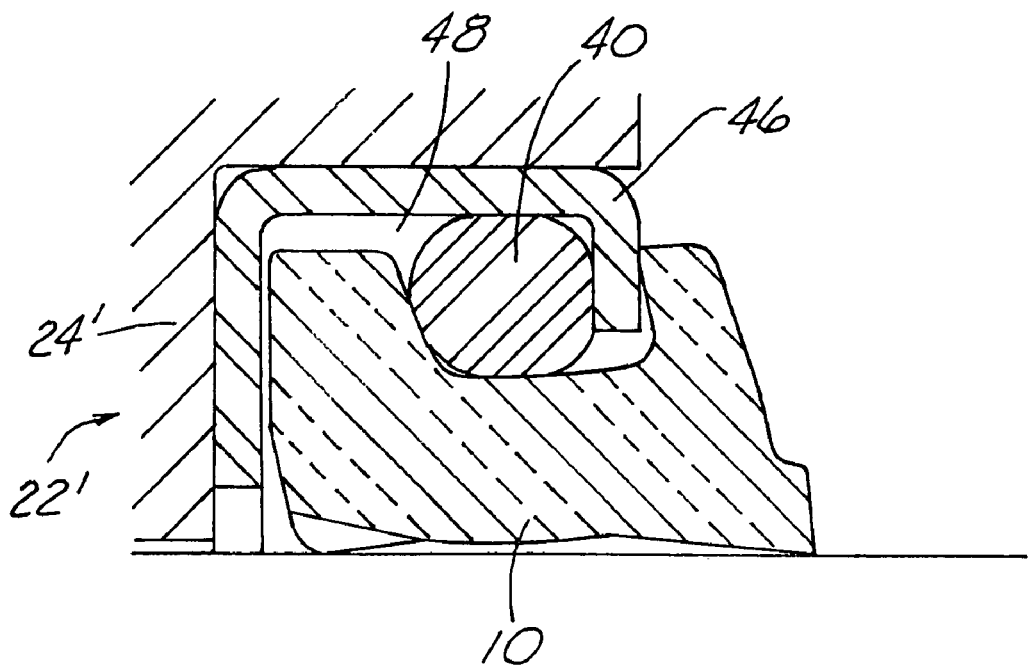
FIG. 3 is a partial cross-sectional view of an alternative embodiment of the invention wherein a can retainer is used to retain the rod wiper element.

An alternative embodiment is illustrated in FIG. 3. In this alternative embodiment, the actuator 22' does not include a front flange. Instead, an annular can 46 is received inside a reduced diameter section 48 of the actuator housing 24'. The upon insertion into the reduced diameter section 48, the annular can 46 and actuator housing 24' accept the load ring 40 and wiper element 10 which then function as previously described.

The wiper element 10 in the preferred embodiment is made of a durable, relatively stiff elastomeric material, preferably a homogeneous synthetic material with a durometer hardness of between about 40 and about 75 on the Shore D scale. Preferred materials include rubber, polyurethane, polyester, polytetrafluorethane or a compound of such materials. The load ring 40 in the preferred embodiment is made of a deformable elastomeric material such as a synthetic rubber compound or a polyurethane with a durometer hardness of between about 70 and about 90 on the Shore A scale.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

I claim:

1. In combination with an actuator housing and a rod of a linear actuator, a rod wiper element for creating a seal between the actuator housing and the rod, the actuator housing comprising and inwardly extending flange having a front face and further comprising an annular groove defined by a front face on the rearward side of the flange, a rear face and a circumferential face, the rod wiper element further comprising:

(a) a forward, inwardly extended lip engageable with the rod of the actuator;
   (b) a rearward, inwardly extended lip axially spaced from the forward lip and also engageable with the rod of the actuator, the two inwardly extended lips being separated by a concave section not engaged with the rod;
   (c) a first outwardly extended lip generally radially aligned with the forward, inwardly extended lip and a second outwardly extended lip generally radially aligned with the rearward, inwardly extended lip, the first and second outwardly extended lips defining a space therebetween, a rearward surface of the forward, outwardly extended lip engaging the front face of the inwardly extending flange of the housing and the rearward, outwardly extended lip being located in the annular groove defined in the housing rearward of the flange; and
   (d) an elastomeric load ring disposed in the space between the first and second outwardly extended lips, the load ring disposed in engagement with a forward surface of the second outwardly extended lip, the circumferential face of the annular groove and the front face of the annular groove defined by the rearward side of the flange.

2. A wiper element as defined in claim 1, wherein the wiper element comprises an elastomeric material.

3. A wiper element as defined in claim 2, wherein compression of the elastomeric material due to an axial force on the outwardly extended lip upon engagement of the actuator housing compresses the forward, inwardly extended lips and the rearward, inwardly extended lip.

* * * * *